United States Patent
Cho et al.

(10) Patent No.: US 7,590,040 B2
(45) Date of Patent: Sep. 15, 2009

(54) SIGNAL DETECTING METHOD AND APPARATUS AND INFORMATION REPRODUCING APPARATUS AND METHOD

(75) Inventors: Yasuo Cho, 4-5-304, Komegafukuro 2-chome, Aoba-ku, Sendai-shi, Miyagi 980-0813 (JP); Atsushi Onoe, Saitama (JP)

(73) Assignees: Yasuo Cho, Miyagi (JP); Pioneer Corporation, Tokyo (JP)

( * ) Notice: Subject to any disclaimer, the term of this patent is extended or adjusted under 35 U.S.C. 154(b) by 752 days.

(21) Appl. No.: 10/568,943

(22) PCT Filed: Jun. 11, 2004

(86) PCT No.: PCT/JP2004/008568

§ 371 (c)(1),
(2), (4) Date: Mar. 22, 2006

(87) PCT Pub. No.: WO2005/020227

PCT Pub. Date: Mar. 3, 2005

(65) Prior Publication Data

US 2008/0214113 A1    Sep. 4, 2008

(30) Foreign Application Priority Data

Aug. 25, 2003    (JP) .............................. 2003-208574

(51) Int. Cl.
*G11B 20/00*    (2006.01)
(52) U.S. Cl. .................................. 369/53.44; 369/47.17
(58) Field of Classification Search ........................ None
See application file for complete search history.

(56) References Cited

U.S. PATENT DOCUMENTS

| | | | |
|---|---|---|---|
| 2,872,529 A | 2/1959 | Hollmann et al. | |
| 4,320,491 A | 3/1982 | Rustman | 369/126 |
| 4,455,638 A | 6/1984 | Wilson | 369/126 |
| 4,489,278 A | 12/1984 | Sawazaki | 324/457 |
| 5,047,649 A | 9/1991 | Hodgson et al. | |
| 5,132,934 A | 7/1992 | Quate et al. | |
| 5,226,029 A | 7/1993 | Takanashi et al. | |

(Continued)

FOREIGN PATENT DOCUMENTS

EP    0 398 656 A2    11/1990

(Continued)

OTHER PUBLICATIONS

International Search Report of PCT/JP2004/008568, mailed Oct. 12, 2004.

(Continued)

*Primary Examiner*—Paul Huber
(74) *Attorney, Agent, or Firm*—Nixon & Vanderhye, PC

(57) ABSTRACT

This signal detection method detects an output signal indicating data information contained at least in two sideband waves from an input signal having a carrier and at least two sideband waves accompanying the carrier. The method includes a cut off step for cutting off a sideband wave positioned at the high frequency side or the low frequency side as compared to the carrier from the at least two sideband waves and a square detection step for outputting an output signal by performing square detection of an input signal having one of the sideband waves which has been cut off.

16 Claims, 4 Drawing Sheets

U.S. PATENT DOCUMENTS

| | | | |
|---|---|---|---|
| 5,412,641 A | 5/1995 | Shinjo et al. | |
| 5,418,029 A | 5/1995 | Yamamoto et al. | 428/64.2 |
| 5,481,527 A | 1/1996 | Kasanuki et al. | 369/126 |
| 5,488,602 A | 1/1996 | Yamano et al. | 369/126 |
| 5,490,132 A | 2/1996 | Yagi et al. | |
| 5,581,537 A | 12/1996 | Yamano et al. | 369/126 |
| 5,635,037 A | 6/1997 | Chu et al. | |
| 5,646,932 A | 7/1997 | Kuribayashi et al. | 369/126 |
| 5,724,336 A | 3/1998 | Morton | |
| 5,751,685 A | 5/1998 | Yi | 369/126 |
| 5,777,977 A | 7/1998 | Fujiwara et al. | 369/126 |
| 5,808,977 A | 9/1998 | Koyanagi et al. | 369/127 |
| 5,864,445 A | 1/1999 | Bennin et al. | |
| 5,914,920 A | 6/1999 | Yokogawa | 369/275.3 |
| 5,946,284 A | 8/1999 | Chung et al. | 369/126 |
| 5,985,404 A | 11/1999 | Yano et al. | |
| 6,001,519 A | 12/1999 | Yang et al. | |
| 6,096,434 A | 8/2000 | Yano et al. | |
| 6,197,989 B1 | 3/2001 | Furukawa et al. | 556/450 |
| 6,249,503 B1 | 6/2001 | Aratani | |
| 6,272,083 B1 | 8/2001 | Aratani | |
| 6,418,091 B1 | 7/2002 | Hirokane et al. | |
| 6,477,132 B1 | 11/2002 | Azuma et al. | 369/126 |
| 6,510,130 B2 | 1/2003 | Hayashi et al. | 369/275.3 |
| 6,515,957 B1 | 2/2003 | Newns et al. | 369/126 |
| 6,653,630 B2 | 11/2003 | Rosenman et al. | 250/306 |
| 6,762,402 B2 | 7/2004 | Choi et al. | 250/234 |
| 6,841,220 B2 | 1/2005 | Onoe et al. | 428/66.7 |
| 6,850,480 B1 | 2/2005 | Naito et al. | |
| 6,912,193 B2 | 6/2005 | Cho et al. | 369/126 |
| 6,942,914 B2 | 9/2005 | Onoe et al. | |
| 6,965,545 B2 | 11/2005 | Hino et al. | 369/13.54 |
| 7,020,064 B2 | 3/2006 | Kim et al. | |
| 7,065,033 B2 | 6/2006 | Onoe et al. | 369/126 |
| 7,149,180 B2 | 12/2006 | Onoe et al. | 369/276 |
| 7,151,739 B2 | 12/2006 | Cho et al. | |
| 7,212,484 B2 | 5/2007 | Maeda et al. | |
| 7,218,600 B2 | 5/2007 | Cho et al. | |
| 7,221,639 B2 | 5/2007 | Onoe et al. | |
| 7,227,830 B2 | 6/2007 | Cho et al. | |
| 7,242,661 B2 | 7/2007 | Cho et al. | |
| 2002/0105249 A1 | 8/2002 | Yoshida et al. | 310/311 |
| 2002/0118906 A1 | 8/2002 | Onoe | 385/14 |
| 2002/0131669 A1 | 9/2002 | Onoe et al. | 385/14 |
| 2003/0021213 A1 | 1/2003 | Hagiwara | 369/101 |
| 2003/0169672 A1 | 9/2003 | Onoe et al. | |
| 2003/0186090 A1 | 10/2003 | Onoe et al. | |
| 2004/0027935 A1 | 2/2004 | Cho et al. | 369/126 |
| 2004/0042351 A1 | 3/2004 | Onoe et al. | 369/13.01 |
| 2004/0047245 A1 | 3/2004 | Onoe et al. | |
| 2004/0090903 A1 | 5/2004 | Cho et al. | 369/126 |
| 2004/0105373 A1 | 6/2004 | Maeda et al. | 369/101 |
| 2004/0105380 A1 | 6/2004 | Cho et al. | 369/126 |
| 2004/0114913 A1 | 6/2004 | Kume | 386/125 |
| 2004/0246879 A1 | 12/2004 | Onoe et al. | |
| 2004/0252621 A1 | 12/2004 | Cho et al. | 369/126 |
| 2004/0263185 A1 | 12/2004 | Cho et al. | 324/636 |
| 2005/0047288 A1 | 3/2005 | Maeda et al. | 369/53.25 |
| 2005/0098532 A1 | 5/2005 | Onoe et al. | 216/22 |
| 2005/0099895 A1 | 5/2005 | Maeda et al. | 369/13.01 |
| 2005/0122886 A1 | 6/2005 | Takahashi et al. | 369/126 |
| 2006/0182004 A1 | 8/2006 | Maeda et al. | |
| 2006/0219655 A1 | 10/2006 | Cho et al. | |
| 2006/0245312 A1 | 11/2006 | Maeda et al. | |
| 2007/0014047 A1 | 1/2007 | Cho et al. | |

FOREIGN PATENT DOCUMENTS

| | | |
|---|---|---|
| EP | 0 480 183 | 4/1992 |
| EP | 0 739 004 | 11/1996 |
| EP | 1 091 355 A2 | 4/2001 |
| EP | 1 154 422 | 11/2001 |
| EP | 1 333 436 | 8/2003 |
| EP | 1 333 436 A | 8/2003 |
| EP | 1 369 864 | 12/2003 |
| EP | 1 381 042 | 1/2004 |
| EP | 1 385 161 | 1/2004 |
| EP | 1 398 779 | 3/2004 |
| EP | 1 398 780 | 3/2004 |
| GB | 644 426 A | 10/1950 |
| GB | 1 351 939 | 5/1974 |
| GB | 1 351 939 A | 5/1974 |
| GB | 1 484 256 | 9/1977 |
| JP | 55 139643 | 10/1980 |
| JP | 55 139643 A | 10/1980 |
| JP | 56-107338 | 8/1981 |
| JP | 57-200956 | 12/1982 |
| JP | 59-22250 | 2/1984 |
| JP | 63-001175 | 1/1988 |
| JP | 06-267122 | 9/1994 |
| JP | 08-075806 | 3/1996 |
| JP | 08-212604 | 8/1996 |
| JP | 09-097457 | 4/1997 |
| JP | 09-153235 | 6/1997 |
| JP | 9-222430 | 8/1997 |
| JP | 09-222430 | 8/1997 |
| JP | 9-511863 | 11/1997 |
| JP | 63 001175 A | 1/1998 |
| JP | 10-334525 | 12/1998 |
| JP | 11-045467 | 2/1999 |
| JP | 11-176033 | 7/1999 |
| JP | 2003-85969 | 3/2003 |
| JP | 2003-163601 | 6/2003 |
| WO | 00/36608 | 6/2000 |

OTHER PUBLICATIONS

Kazuta et al, "Determination of crystal polarities of piezoelectric thin film using scanning nonlinear dielectric microscopy", Journal of European Ceramic Society 21 (2001) 1581-1584.

The Institution of Electrical Engineers, Stevenage, GB; Jun. 1, 2002; Hiranaga et al, "Nano-sized inverted domain formation in stoichiometric LiTaO/sub3/single crystal using Scanning Nonlinear Dielectric Microscopy", XP002292217.

Cho et al, "Scanning nonlinear dielectric microscopy with nanometer resolution", Journal of European Ceramic Society 21 (2001) 2131-2134.

Cho et al., Nano domain engineering using scanning nonlinear dielectric microscopy, Oct. 29, 2001, IEE-NANO 2001, pp. 352-357.

European Search Report issued in corresponding EP Application No. 04746081.1, dated Nov. 6, 2008.

Society of Applied Physics Lecture Meeting (2001.9 Aichi Institute of Technology) 12p-ZR-2. (Abstract).

Kazuta et al, "Determination of crystal polarities of piezoelectric thin film using scanning nonlinear dielectric microscopy", Journal of European Ceramic Society 21 (2001) 1581-1584. (Abstract).

The Institution of Electrical Engineers, Stevenage, GB; Jun. 1, 2002; Hiranaga et al, "Nano-sized inverted domain formation in stoichiometric LiTaO/sub3/single crystal using Scanning Nonlinear Dielectric Microscopy", XP002292217. (Abstract).

Cho et al, "Scanning nonlinear dielectric microscopy with nanometer resolution", Journal of European Ceramic Society 21 (2001) 2131-2134.

Cho et al., Nano domain engineering using scanning nonlinear dielectric microscopy, Oct. 29, 2001, IEE-NANO 2001, pp. 352-357.

Cho et al, "Tbit/inch$^2$ ferroelectric data storage based on scanning nonlinear dielectric microscopy", Applied Physics Letters, vol. 81, No. 23, Dec. 2, 2002, pp. 4401-4403.

Odagawa et al, "Measuring ferroelectric polarization component parallel to the surface by scanning nonlinear dielectric microscopy", Applied Physics Letters, vol. 80, No. 12, Mar. 25, 2002.

Matsuura et al, "Fundamental Study on Nano Domain Engineering Using Scanning Nonlinear Dielectric Microscopy", Jpn. J. Appl. Phys. vol. 40 (2001) pp. 4354-4356, Part 1, No. 6B Jun. 2001.

(a)

(b)

(a)

(b)

SIGNAL DETECTING METHOD AND APPARATUS AND INFORMATION REPRODUCING APPARATUS AND METHOD

This application is the US national phase of international application PCT/JP2004/008568, filed 11 Jun. 2004, which designated the U.S. and claims priority of JP 2003-208574, filed 25 Aug. 2003, the entire contents of each of which are hereby incorporated by reference.

TECHNICAL FIELD

The present invention relates to a signal detecting method and a signal detecting apparatus in reproducing polarization information recorded in a dielectric substance, such as a ferroelectric recording medium, for example, as well as an information reproducing apparatus and an information reproducing method which use the signal detecting method.

BACKGROUND ART

The inventors of the present invention has proposed a technology of a recording/reproducing apparatus which uses SNDM (Scanning Nonlinear Dielectric Microscopy) for nanoscale analysis of a dielectric recording medium. In the SNDM, it is possible to increase resolution of measurement to sub-nanometer, by using an electrically conductive cantilever (or probe) having a small probe on its tip, which is used for atomic force microscopy (AFM) or the like. Recently, a super high-density recording/reproducing apparatus has been developed, wherein the apparatus records data into a recording medium having a recording layer made of a ferroelectric material by using the technology of SNDM (Japanese Patent Application Laying Open NO. 2003-085969).

In the recording/reproducing apparatus which uses the SNDM, the information is reproduced by detecting the positive or negative direction of the polarization in the recording medium. This is performed by using the fact that the oscillation frequency of an LC oscillator is changed due to a small capacitance change $\Delta C$ resulted from the inequality of a nonlinear dielectric constant caused by the distribution of the positive polarization and the negative polarization, wherein the LC oscillator includes a high-frequency feedback amplifier including an L component (inductance component), a conductive probe mounted thereon and a capacitance Cs of the ferroelectric material under the probe. In other words, the change of the distribution of the positive polarization and the negative polarization can be detected as an oscillation frequency change $\Delta f$.

Moreover, by applying an alternating electric field with a sufficiently low frequency to the oscillation frequency in order to detect a difference of the positive polarization and the negative polarization, the oscillation frequency is changed along with the alternating electric field. At the same time, a ratio of the change in the oscillation frequency including a plus-minus sign is determined depending on the nonlinear dielectric constant of the ferroelectric material under the probe.

Then, a component caused by the alternating electric field is FM (Frequency Modulation)-demodulated and extracted from a high-frequency signal of the LC oscillator which is FM-modulated in accordance with the small capacitance change $\Delta C$ along with the application of the alternating electric field, as described above. As a result, the record information recorded in the ferroelectric recording medium is reproduced.

DISCLOSURE OF INVENTION

If the information is reproduced by applying the alternating electric field, as described above, there is an advantage of a good S/N ratio. However, FM-demodulation is necessary in the reproduction process. Therefore, a reproduction speed upon the reproduction is influenced by the frequency of the alternating electric field. In other words, for the higher-speed reproduction, it is necessary to sufficiently increase the frequency of a high-frequency signal corresponding to a carrier wave and increase the frequency of the alternating electric field to thereby ensure a broader or wider modulation band.

However, in order to ensure the wide modulation band, a FM-demodulation circuit which allows the demodulation of the wide modulation band in a high-frequency zone is required. The currently used FM demodulator can only perform demodulation in a band of about 200 kHz. In the demodulation in the band, it is difficult or impossible to realize a reproduction speed of about 1 Gbps, for example, which is required in the recording/reproducing apparatus which uses the SNDM described above. Therefore, it is not possible to sufficiently improve the reproduction speed on the recording/reproducing apparatus, so that there is a technical problem that it is difficult or impossible to realize high-speed reproduction which is essential to the realization of a large-capacity recording medium.

In order to solve the above-mentioned problems, it is therefore an object of the present invention to provide a signal detecting method and a signal detecting apparatus which can relatively easily demodulate a signal obtained by modulating a high-frequency carrier waver in a broadband, for example, and which can improve the reproduction speed of the signal, as well as an information reproducing apparatus and an information reproducing method which use the signal detecting method.

The present invention will be discussed hereinafter.

The signal detecting method of the present invention is a signal detecting method of detecting an output signal which indicates data information included at least two sideband waves from an input signal having a carrier wave and the at least two sideband waves which accompany the carrier wave, the signal detecting method provided with: a cutting process of cutting the sideband wave located on one of a high-frequency side and a low-frequency side as compared to the carrier wave, from the at least two sideband waves; and a squared-detecting process of outputting the output signal by squared-detecting the input signal in which the one of the sideband waves is cut.

According to the signal detecting method of the present invention, it is possible to detect the output signal which indicates the data information, such as audio information and image information, relatively easily and appropriately, from the input signal including the high-frequency carrier wave.

Specifically explaining it, the input signal includes the carrier wave and the sideband waves. In other words, the input signal may be a signal in which FM-modulation, for example, is performed to the carrier wave. Then, with respect to the input signal, the sideband wave is cut in the cutting process. In particular, at least two sideband waves appear at symmetrical positions, with the frequency of the carrier wave as a center frequency. Thus, one of the sideband wave which appears on the high-frequency side and the sideband wave which appears on the low-frequency side is cut. The sideband wave can be easily cut by the operation of a LPF (Low Pass Filter) and a HPF (High Pass Filter), for example.

Then, the input signal in which one portion of the sideband waves is cut is squared-detected in the squared-detecting process. Then, the output signal can be detected from the signal after the squared-detection.

Here, if the squared-detection is performed to the input signal without providing the cutting process, the output signal cannot be detected because the output signal components, included in the relative sideband waves on the high-frequency side and the low-frequency side, cancel each other, as explained later by using equations. However, according to the signal detecting method of the present invention, by cutting the sideband wave on one side of the high-frequency side and the low-frequency side, it is possible to appropriately detect the output signal included in the remaining sideband wave without being cut.

Then, if the signal detecting method is applied to an information reproducing apparatus, as described later, even if broadband modulation is performed in the high-frequency carrier wave, regardless of the band limit of demodulation as seen in a conventional FM demodulator, it is possible to appropriately perform the demodulation, and consequently, it is possible to detect the output signal. In other words, specifically, even if modulation is performed at several tens MHz to the carrier wave of several GHz, for example, it is possible to detect (i.e. demodulate) the output signal.

Moreover, if a FM signal is used as the input signal, for example, there is an advantage that a position relationship on a frequency axis between the carrier wave and the sideband waves caused by the output signal is not changed, even if it is influenced by the sideband waves caused by a change in a floating capacitance or the like (i.e. external noise, etc.), other than from the sideband wave caused by the output signal. Therefore, by performing the squared-detection based on the carrier wave, it is possible to perform stable signal detection without an influence of the floating capacitance or the like.

Consequently, according to the signal detecting method of the present invention, there is no more band limit as in a conventional FM demodulator, so that even if modulation in a wider or broader band is performed to the higher-frequency carrier wave, it is possible to appropriately detect the output signal. Therefore, this enables the information reproducing apparatus described later to improve the detection speed (i.e. reproduction speed) of the output signal, for example. Then, without an influence of noise from the exterior due to the floating capacitance or the like, it is possible to realize the stable signal detection.

Incidentally, in order to realize the signal detecting method, a circuit element, such as a squared-detector including a diode or the like, and a LPF, can be used for the realization, so that there is also such an advantage that a circuit structure which uses the circuit element can be simplified.

In one aspect of the signal detecting method of the present invention, the signal detecting method is further provided with a frequency converting process of converting a frequency of the input signal, and the one of the sideband waves is cut from the input signal whose frequency is converted in the cutting process.

According to this aspect, by virtue of the frequency converting process, it is possible to convert the frequency of the input signal (i.e. the frequency of the carrier wave) to a higher frequency or a lower frequency. Even if it is difficult to perform signal processing (i.e. processing in the cutting process and the squared-detecting process or the like) because of the high frequency of the carrier wave, it is possible to make a frequency which facilitates the signal processing by converting the frequency. Then, after that, it is possible to perform the signal processing in the cutting process and the squared-detecting process or the like, relatively easily, with respect to the input signal after the frequency conversion. Therefore, it is possible to improve the efficiency of the signal processing, and moreover it is possible to improve the reproduction speed of the information reproducing apparatus described later, for example.

In an aspect of the signal detecting method provided with the frequency converting process, as described above, the frequency is converted to make it relatively low in the frequency converting process.

By such construction, by converting the input signal to have a lower frequency, the subsequent signal processing can be performed, relatively easily.

Specifically, even if the modulation is performed at several tens MHz to the carrier wave of several GHz, for example, it is possible to detect the output signal, relatively easily, by reducing the frequency of the carrier wave to about several hundreds MHz, for example, in the frequency converting process.

Moreover, by expanding the modulation band, the capacity of the output signal which can be detected per unit time increases, so that it is possible to improve the reproduction speed of the information reproducing apparatus descried later, for example.

Incidentally, if the input signal is the FM signal, there is an advantage that the position relationship (i.e. modulation bandwidth) on the frequency axis between the carrier wave and the sideband waves is not changed, even if the frequency conversion is performed to the carrier wave. Therefore, it is possible to appropriately detect the output signal from the input signal after the frequency conversion.

In another aspect of the signal detecting method provided with the frequency converting process, as described above, the signal detecting method is further provided with a judging process of judging whether or not the frequency is higher than a predetermined value, and if it is judged in the judging process that the frequency is higher than the predetermined value, the frequency is converted in the frequency converting process.

By such construction, it is possible to perform or not perform the frequency conversion, in accordance with the frequency of the input signal. By this, the frequency can be converted if necessary, and as a result, it is possible to perform the signal processing, more efficiently.

Incidentally, the predetermined value which is a threshold value in the judging process may be a value uniquely determined in advance, or may be a value inputted at each time of the signal detection. Moreover, the predetermined value may be a value inputted by a user which uses the signal detecting method, or may be a value automatically determined by a micro computer or the like.

In another aspect of the signal detecting method of the present invention, the carrier wave and a first-order sideband wave are squared-detected, out of the input signal in which the one of the sideband waves is cut, in the squared-detecting process.

According to this aspect, it is possible to detect the output signal by using the first-order (or primary) sideband wave. In other words, although a plurality of sideband waves with different frequency components appear with the carrier wave as the center frequency, if the first-order sideband wave out of them is extracted, the output signal can be detected.

In an aspect of the signal detecting method in which the first-order sideband wave is squared-detected, as described above, if an amplitude of the carrier wave is $V_0$, a modulation index is $mf_1$, an angular frequency of the carrier wave is $\omega_0$, and a difference in the angular frequency between the carrier wave and the first-order sideband wave is $\omega_p$, the first sideband wave is squared-detected, with it expressed by $(V_0 mf_1/2) \times \cos((\omega_0+\omega_p)t)$ or $-(V_0 mf_1/2) \times \cos((\omega_0-\omega_p)t)$ at a time point of t.

By such construction, it is possible to detect the output signal by squared-detecting the first-order sideband wave expressed by the equation. Incidentally, the detailed explanation of the equation will be discussed in an embodiment described later.

In another aspect of the signal detecting method of the present invention, the sideband wave on the high-frequency side is cut out of the at least two sideband waves in the cutting process.

According to this aspect, in the case where the sideband wave on the high frequency side is cut by a LPF, for example, it is possible to perform the signal detecting method of the present invention, more easily, because there is generally less influence of the phase change of the signal, as compared to the case where the sideband wave on the low frequency side is cut by a HPF, for example.

In another aspect of the signal detecting method of the present invention, the data information is recorded in a recording medium, and the signal detecting method is further provided with a signal obtaining process of obtaining the input signal by applying a high-frequency electric field to the recording medium and by applying an alternating electric field with a lower frequency than that of the high-frequency electric field.

According to this aspect, for example, even on the information reproducing apparatus which uses the principle of SNDM, as described later, the output signal can be appropriately detected. Incidentally, the reproducing apparatus which uses the principle of SNDM will be discussed later.

In an aspect provided with the signal obtaining process, as described above, the recording medium may be provided with a recording layer including a dielectric substance.

By such construction, even on the information reproducing apparatus which uses the principle of SNDM, as described later, the output signal can be appropriately detected, to thereby reproduce the data.

The signal detecting apparatus of the present invention is a signal detecting apparatus for detecting an output signal which indicates data information included at least two sideband waves from an input signal having a carrier wave and the at least two sideband waves which accompany the carrier wave, the signal detecting apparatus provided with: a cutting device for cutting the sideband wave located on one of a high-frequency side and a low-frequency side as compared to the carrier wave, from the at least two sideband waves; and a squared-detecting device for outputting the output signal by squared-detecting the input signal in which the one of the sideband waves is cut.

According to the signal detecting apparatus of the present invention, as in the above-mentioned signal detecting method, even if modulation in a wider or broader band is performed to the higher-frequency carrier wave, it is possible to appropriately perform the demodulation and detect the output signal.

Incidentally, in response to the various aspects of the signal detecting method of the present invention, the signal detecting apparatus of the present invention can adopt various aspects.

The information reproducing apparatus of the present invention is an information reproducing apparatus for reproducing data information recorded in a recording medium, the information reproducing apparatus provided with: a reading device for reading a reproduction signal having a carrier wave and at least two sideband waves which accompany the carrier wave and which include the data information, from the recording medium; a cutting device for cutting the sideband wave located on one of a high-frequency side and a low-frequency side as compared to the carrier wave, from the at least two sideband waves; a squared-detecting device for squared-detecting the reproduction signal in which the one of the sideband waves is cut; and a reproducing device for extracting and reproducing the data information from the squared-detected reproduction signal.

According to the information reproducing apparatus of the present invention, it is possible to extract the data information from the reproduction signal including the high-frequency carrier wave, and reproduce it, relatively easily and appropriately.

Specifically, at first, the reading device reads the reproduction signal including the data information recorded in the recording medium. Here, the reproduction signal has the carrier wave and the at least two sideband waves including the data information. In other words, for example, modulation is performed to the carrier wave, to thereby read the reproduction signal including the data information recorded in the recording medium. The method of the modulation may be FM modulation, for example.

Then, out of the sideband waves, the sideband wave located on either one of the high-frequency side and the low-frequency side on the basis of the carrier wave is cut by the cutting device.

After that, the squared-detecting device performs squared-detection to the reproduction signal in which one of the sideband waves is cut. Then, in accordance with the squared-detected reproduction signal, the reproducing device extracts and reproduces the data information. At this time, the reproducing device may perform phase-detection, such as coherent detection or synchronized detection, to the squared-detected reproduction signal, to thereby extract the data information.

In particular, by providing the cutting device and the squared-detecting device, it is possible to receive the benefits owned by the above-mentioned signal detecting method of the present invention. In other words, even if broadband modulation is performed to the high-frequency carrier wave, regardless of the band limit of demodulation as seen in a conventional FM demodulator, it is possible to appropriately perform the demodulation and reproduce the data information.

Consequently, according to the information reproducing apparatus of the present invention, as in the above-mentioned signal detecting method of the present invention, if the carrier wave has a high frequency of about several GHz, for example, and even if modulation is performed at about several tens MHz to the carrier wave, it is possible to appropriately perform the demodulation and reproduce the data information included in the modulated reproduction signal. Moreover, since the modulation band can be expanded, it is possible to improve the reproduction speed. This is an extremely great advantage in the reproduction of the large-capacity recording medium, as in a ferroelectric recording medium, for example.

Incidentally, in response to the various aspects of the signal detecting method of the present invention, the information reproducing apparatus of the present invention can adopt various aspects.

In one aspect of the information reproducing apparatus of the present invention, the reading device reads the reproduction signal by applying a high-frequency electric field to a recording layer of the recording medium and by applying an alternating electric field with a lower frequency than that of the high-frequency electric field.

According to this aspect, it is possible to read the reproduction signal in which modulation based on the frequency of the low-frequency alternating electric field is performed to the carrier wave corresponding to the high-frequency electric field.

In another aspect of the information reproducing apparatus of the present invention, the information reproducing apparatus is further provided with a frequency converting device for converting a frequency of the reproduction signal, and the cutting device cuts the one of the sideband waves from the reproduction signal whose frequency is converted.

According to this aspect, even if it is difficult to perform the signal processing because of the high-frequency of the carrier wave, for example, by converting the frequency, it is possible to perform the signal processing at a frequency which facilitates the signal processing. Therefore, it is possible to improve the efficiency of the signal processing, and it is possible to improve the reproduction rate of the information reproducing apparatus.

In another aspect of the information reproducing apparatus of the present invention, the recording medium is provided with a recording layer including a dielectric substance.

According to this aspect, as discussed in detail later, it is possible to appropriately reproduce, for example, polarization information in the recording layer including the dielectric substance, as the data information.

In another aspect of the information reproducing apparatus of the present invention, the information reproducing apparatus reproduces the data information on the basis of nonlinear dielectric microscopy.

According to this aspect, it is possible to appropriately reproduce the data information recorded in the recording medium, by using the principle of SNDM (e.g. by using the principle of SNDM on the reading device). In other words, super high-density information reproduction can be performed.

The information reproducing method of the present invention is an information reproducing method of reproducing data information recorded in a recording medium, the information reproducing method provided with: a reading process of reading a reproduction signal having a carrier wave and at least two sideband waves which accompany the carrier wave and which include the data information, from the recording medium; a cutting process of cutting the sideband wave located on one of a high-frequency side and a low-frequency side as compared to the carrier wave, from the at least two sideband waves; a squared-detecting process of squared-detecting the reproduction signal in which the one of the sideband waves is cut; and a reproducing process of extracting and reproducing the data information from the squared-detected reproduction signal.

According to the information reproducing method of the present invention, as in the above-mentioned information reproducing apparatus of the present invention, if the carrier wave has a high frequency of about several GHz, for example, and even if modulation is performed at several tens MHz to the carrier wave, it is possible to appropriately perform the demodulation and reproduce the data information included in the modulated reproduction signal.

Incidentally, in response to the various aspects of the information reproducing apparatus of the present invention, or the various aspects of the signal detecting method of the present invention, the information reproducing method of the present invention can adopt various aspects.

These effects and other advantages of the present invention become more apparent from the following embodiments.

As explained above, according to the signal detecting method and apparatus, they are provided with the cutting process and the squared-detecting process, or the cutting device and the squared-detecting device, respectively. Therefore, even if modulation in a wider or broader band is performed to the higher-frequency carrier wave, it is possible to appropriately detect the output signal.

Moreover, according to the information reproducing apparatus and method, they are provided with: reading device; the cutting device; the squared-detecting device; and the reproducing device, or the reading process; the cutting process; the squared-detecting process; and the reproducing process, respectively. Therefore, if the carrier wave has a high frequency of about several GHz, for example, and even if modulation is performed at several tens MHz to the carrier wave, it is possible to appropriately perform the demodulation and reproduce the data information included in the modulated reproduction signal.

BEST MODE FOR CARRYING OUT THE INVENTION

Hereinafter, the embodiment of the present invention will be explained with reference to the drawings. Incidentally, in the embodiment, an explanation will be given by exemplifying a ferroelectric reproducing apparatus (i.e. an embodiment according to the information reproducing apparatus of the present invention) for reproducing data information recorded in a ferroelectric recording medium, by using the above-mentioned signal detecting method of the present invention.

(Basic Structure)

Figure 1:
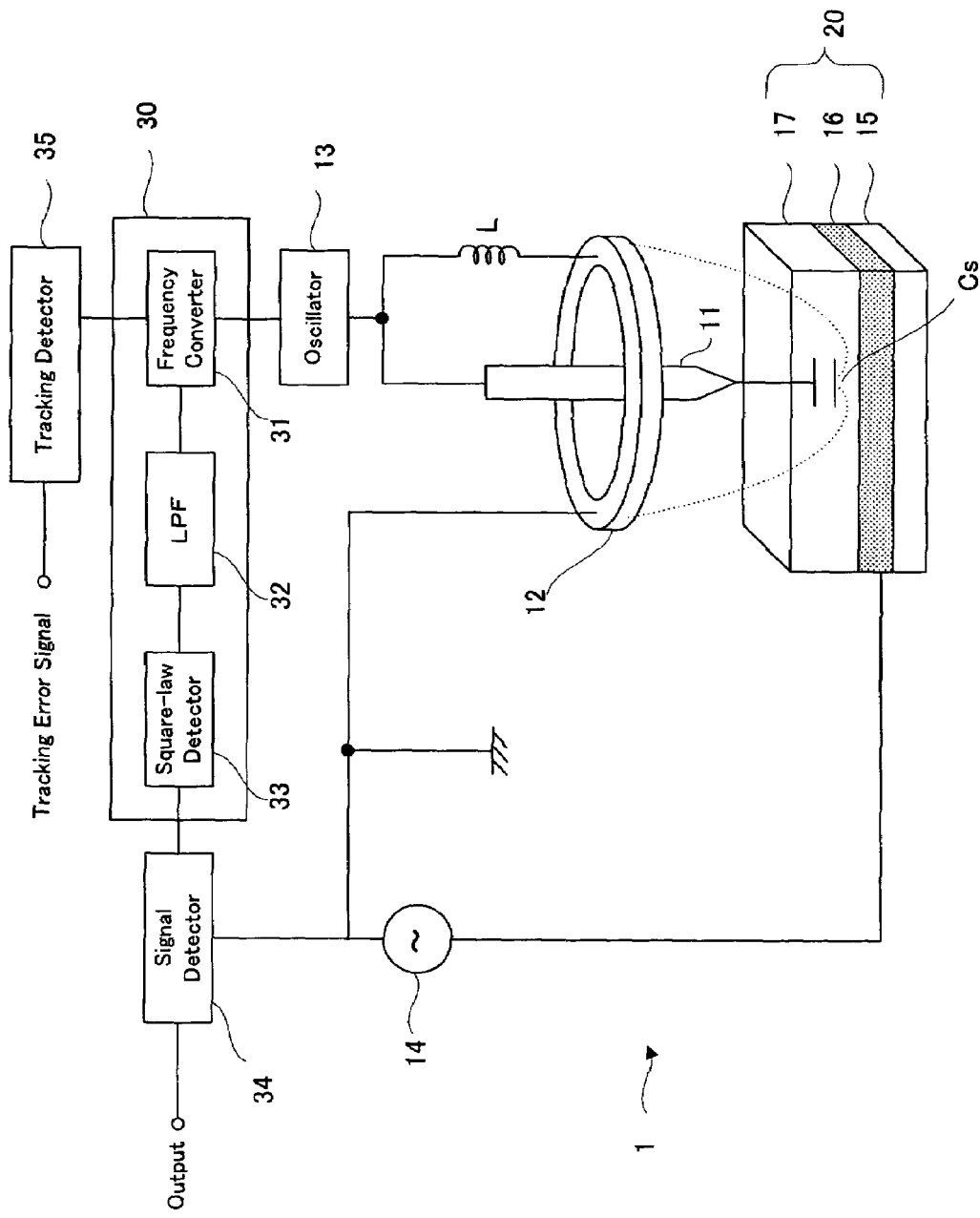
FIG. 1 is a block diagram conceptually showing the basic structure of an embodiment according to a ferroelectric reproducing apparatus which adopts a signal detecting method of the present invention.

At first, the basic structure of the ferroelectric reproducing apparatus in the embodiment will be discussed with reference to FIG. 1. FIG. 1 is a block diagram conceptually showing the basic structure of the ferroelectric reproducing apparatus in the embodiment.

A ferroelectric reproducing apparatus 1 is provided with: a probe 11 for applying an electric field, with its tip facing or opposed to a ferroelectric material 17 of a ferroelectric recording medium 20; a return electrode 12 to which a high-frequency electric field for signal reproduction, applied from the probe 11, returns; an inductor L disposed between the probe 11 and the return electrode 12; an oscillator 13 which oscillates at a resonance frequency determined based on the inductor L and a capacitance Cs of a portion which is polarized in accordance with record information and which is formed in the ferroelectric material under the probe 11; an alternating current (AC) signal generator 14 for applying an alternating electric field to detect the state of the polarization recorded in the ferroelectric material 17; a demodulator 30 for demodulating a FM signal modulated by the capacitance corresponding to the polarization state of the ferroelectric material 17 under the probe 11; a signal detector 34 for detecting data from the demodulated signal; a tracking error detector 35 for detecting a tracking error signal from the demodulated signal; and the like.

The probe 11 is obtained by covering or coating a conductive film on a conductive member or an insulation member, and has a spherical tip with a predetermined radius which faces the ferroelectric material 17. The radius is a large factor which determines the diameter of the polarization that is formed in the ferroelectric material 17 in accordance with the record data, and it is extremely small on the order of 10 nm. Then, the probe 11 is an electrode for applying an electric field to the ferroelectric material 17, and a needle-shape, a cantilever-shape, or the like are known as its specific shape.

Incidentally, there may be provided a plurality of probes 11. In this case, a plurality of AC signal generators 14 are preferably provided for the respective probes 11. Moreover, in order to distinguish reproduction signals corresponding to the respective AC signal generators 14 on the signal detector 34, it is preferable that a plurality of signal detectors 34 are provided and that the signal detectors 34 obtain reference signals from the respective AC signal generators 14, to thereby output the corresponding reproduction signals. Alternatively, instead of providing the plurality of AC signal generators 14 in association with the respective probes 11, it is possible to provide a plurality of oscillators 13 and a plurality of demodulators 30.

The return electrode 12 is an electrode to which the high-frequency electric field applied to the ferroelectric material 17 from the probe 11 (i.e. a resonance electric field from the oscillator 13) returns, and is located to surround the probe 11. Incidentally, the shape and placement of the return electrode 12 can be arbitrarily set, if the high-frequency electric field can return to the return electrode 12 without trouble.

The inductor L is located between the probe 11 and the return electrode 12, and may be formed from a microstripline, for example. A resonance circuit includes the inductor L and the capacitance Cs. The inductance of the inductor L is determined such that this resonance frequency is approximately 1 GHz, for example.

The oscillator 13 is an oscillator which oscillates at the resonance frequency determined from the inductor L and the capacitance Cs. The oscillation frequency varies, depending on the change of the capacitance Cs. Therefore, FM modulation is performed correspondingly to the change of the capacitance Cs determined by a polarization domain corresponding to the recorded data. By demodulating this FM modulation, it is possible to read the recorded data.

The AC signal generator 14 applies an alternating electric field between the probe 11 or the return electrode 12 and an electrode 16. In the ferroelectric recording/reproducing apparatus provided with the plurality of proves 11, the frequencies of the alternating electric fields are used as reference signals for synchronization, to thereby distinguish signals detected with the probes 11. If the frequency of the oscillator 13 is about 10 MHz to 10 GHz, for example, the frequencies of the alternating electric fields are at most about 1% of the frequency of the oscillator 13; namely, about 100 KHz to 100 MHz. In that condition, the alternating electric fields are applied to the micro-domains of the ferroelectric material 17.

Incidentally, the probe 11, the return electrode 12, the oscillator 13, and the AC signal generator 14 constitute one specific example of the above-mentioned "reading device" of the present invention.

The demodulator 30 demodulates the oscillation frequency of the oscillator 13, which is FM-modulated due to the small change of the capacitance Cs, and makes a waveform corresponding to the polarized state of a portion which is traced by the prove 11. If the recorded data are digital data of "0" and "1", the frequency of a signal demodulated in accordance with each data is the same as that of the AC signal generator 14, and there is a difference of exactly 180 degrees in phase, in response to the plus and minus of the polarization direction of the ferroelectric substance. Therefore, by judging the phase, it is possible to easily reproduce the data.

Particularly in the embodiment, the demodulator 30 is provided with: a frequency converter 31; a LPF (Low Pass Filter) 32; and a squared-detector 33.

The frequency converter 31 converts (i.e. mixing down) the oscillation frequency including the reproduction signal (i.e. output signal) to a lower frequency. For example, if the oscillation frequency is about 1 GHz, the frequency may be converted to a frequency of about 100 MHz, for example, through the frequency converter 31.

The frequency converter 31 may include: a multiplier for multiplying the FM signal outputted from the oscillator 13 by a signal having a predetermined frequency component; a LPF (or HPF); or the like.

The LPF 32 selectively makes a low-frequency component pass through and cuts off a high-frequency component, from among the oscillation frequency including the reproduction signal. In particular, on the basis of the oscillation frequency (i.e. the frequency of a carrier wave in which the reproduction signal is superimposed), the LPF 32 selectively makes a frequency component lower than the oscillation frequency pass through.

The squared-detector 33 squared-detects the FM signal which includes the reproduction signal and which has passed through the LPF 32. Then, it outputs the detected reproduction signal to the signal detector 34. As the squared-detector 33, it is possible to use a nonlinear element, such as a diode, and a multiplier.

The signal detector 34 reproduces the recorded data from the signal demodulated on the demodulator 30. A lock-in amplifier is used as the signal detector 34, for example, and coherent detection or synchronized detection is performed on the basis of the frequency of the alternating electric field of the AC signal generator 14, to thereby reproduce the data. Incidentally, it is obvious that another phase detection device may be used.

The tracking error detector 35 detects a tracking error signal for controlling the apparatus, from the signal demodulated on the demodulator 30. The detected tracking error signal is inputted into a tracking mechanism for the control.

Figure 2:
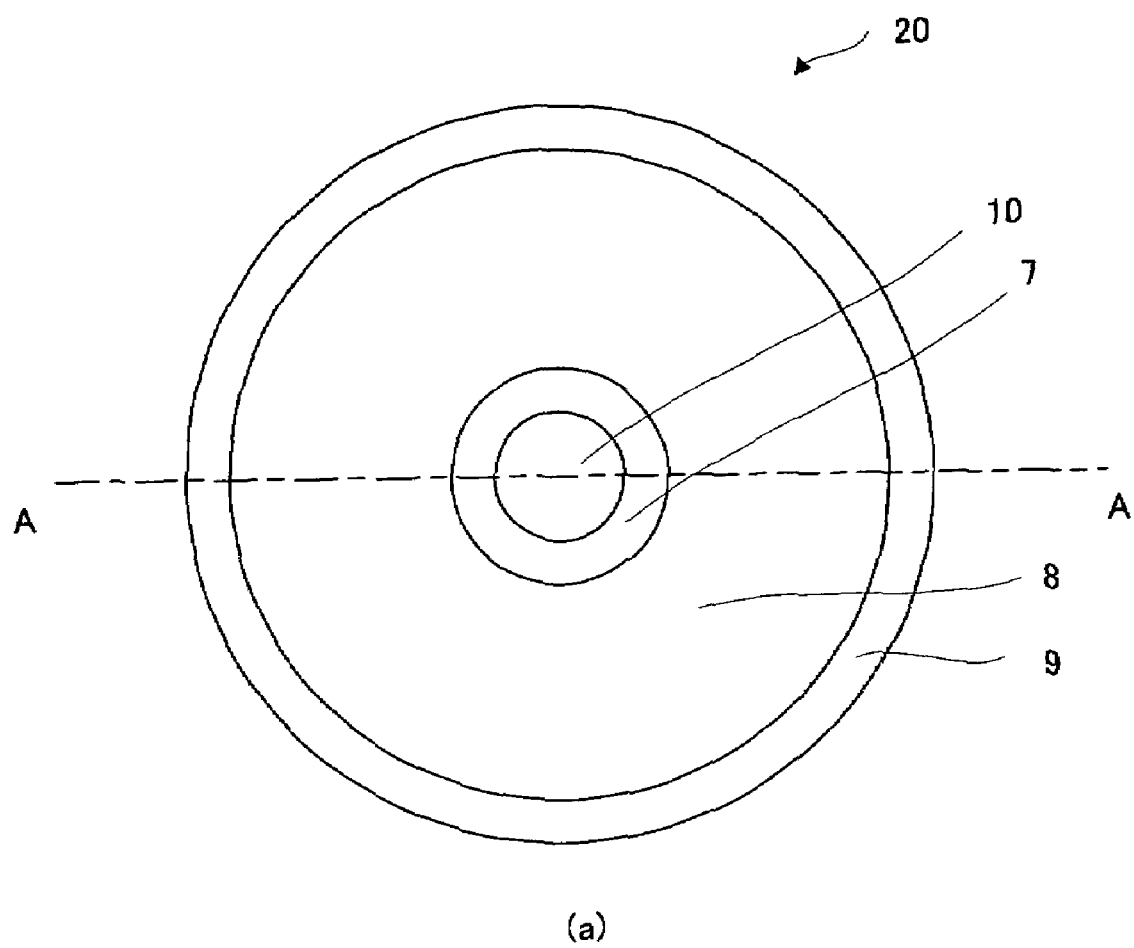
FIGS. 2 are an explanatory diagram and a cross sectional view, conceptually showing a ferroelectric recording medium used for the reproduction of the ferroelectric reproducing apparatus in the embodiment.
Figure 2:
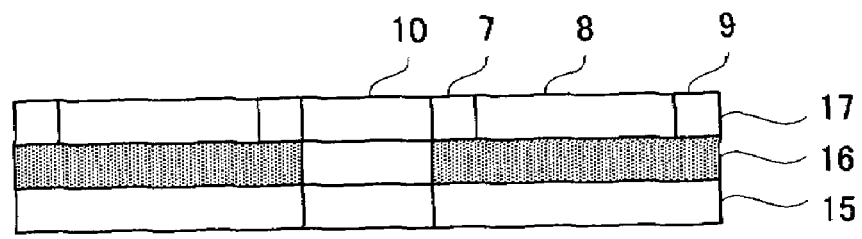

Next, one example of the ferroelectric recording medium 20 shown in FIG. 1 will be explained with reference to FIG. 2. FIG. 2 are schematic diagrams conceptually showing one example of the ferroelectric recording medium 20 used in the embodiment.

As shown in FIG. 2(a), the ferroelectric recording medium 20 is a disc-shaped ferroelectric recording medium, and is provided with: a center hole 10; and an inner area 7, a recording area 8, and an outer area 9, which are located concentrically from the center hole 10 in this order. The center hole 10 is used to mount the ferroelectric recording medium 20 on a spindle motor or in a similar case.

The recording area 8 is an area to record the data therein and has tracks and spaces between the tracks. Moreover, on the tracks and the spaces, there is provided an area to record therein control information associated with the record and reproduction. Furthermore, the inner area 7 and the outer area 9 are used to recognize the inner position and the outer position of the ferroelectric recording medium 20, respectively, and can be used as areas to record therein information about the data to be recorded, such as a title, its address, a recording time length, and a recording capacity. Incidentally, the above-described structure is one example of the ferroelectric recording medium 20, and another structure, such as a card-shape, can be also adopted.

Moreover, as shown in FIG. 2(b), the ferroelectric recording medium 20 is formed such that the electrode 16 is laminated on a substrate 15 and that the ferroelectric material 17 is laminated on the electrode 16.

The substrate 15 is Si (silicon), for example, which is a preferable material in its strength, chemical stability, workability, or the like. The electrode 16 is intended to apply an electric field between the electrode 16 and the return electrode 12 (or the probe 11). By applying such an electric field to the ferroelectric material 17 that is equal to or stronger than the coercive electric field of the ferroelectric material 17, the polarization direction is determined. By determining the polarization direction in accordance with the data, the recording is performed.

The ferroelectric material 17 is formed by connecting single crystal which is made by thinning $LiTaO_3$ or $LiNbO_3$ or the like on the electrode 16 to about 100 nm, or by a known technology, such as spattering and MOCVD. Then, the recording is performed with respect to the Z surface of $LiTaO_3$ or $LiNbO_3$ in which the plus (or positive) and minus (or negative) surfaces of the polarization have a 180-degree domain relationship. It is obvious that another ferroelectric material may be used.

Moreover, as the shape of the ferroelectric recoding medium 20, for example, there are a disc shape and a card shape and the like. The displacement of the relative position with respect to the probe 11 is performed by the rotation of the medium, or by displacing linearly either the probe 11 or the medium.

(Operation Principle)

Figure 7:
FIG. 7 are spectral views which indicate a signal after adding the frequency conversion of the oscillation signal shown in FIG. 5.
Figure 7:
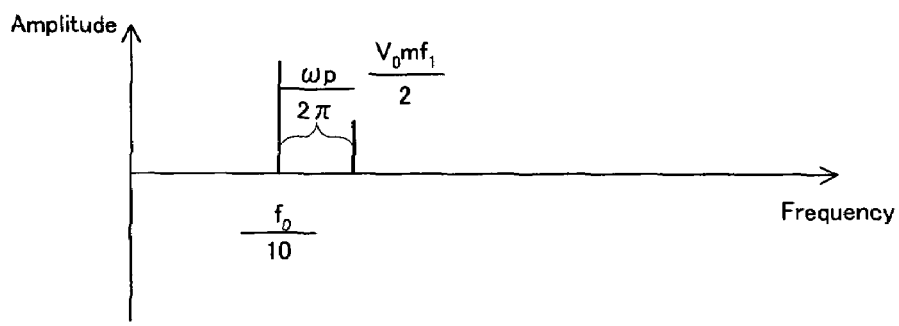

Next, with reference to FIG. 3 and FIG. 7, the operation principle of the ferroelectric recording/reproducing apparatus in the embodiment will be explained.

Incidentally, as the premise of the reproduction, the data information which is reproduced by the ferroelectric recording/reproducing apparatus 1 is recorded by the polarization direction in the ferroelectric material 17 in the ferroelectric recording medium 20. Here, the record operation will be explained with reference to FIG. 3. FIG. 3 is a cross sectional view conceptually showing the operation of recording the data information. Incidentally, the ferroelectric recording/reproducing apparatus 1 is an apparatus for performing an operation of reproducing the data information; however, it can also perform an operation as a ferroelectric recording apparatus by applying a predetermined electric field (particularly, a pulse electric field) between the probe 11 and the electrode 16.

Figure 3:
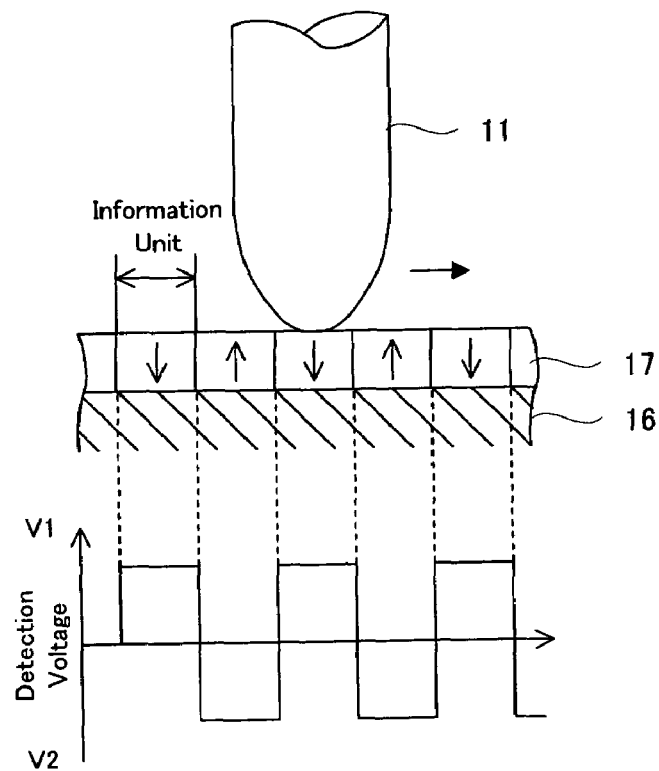
FIG. 3 is a cross sectional view conceptually showing an operation of recording data information into the ferroelectric recording medium, which is a reproduction target of the ferroelectric reproducing apparatus in the embodiment.

As shown in FIG. 3, by applying an electric field which exceeds the coercive electric field of the ferroelectric material 17 between the probe 11 and the electrode 16, the ferroelectric material 17 is polarized having a direction corresponding to the direction of the applied electric field. Then, by controlling an applying voltage to thereby change the polarization direction, it is possible to record the data information. For example, it is assumed that when an electric field which directs from the probe 11 to the electrode 16 is applied, the micro domain has downward polarization P, and that when an electric field which directs from the electrode 16 to the probe 11 is applied, the micro domain has upward polarization P. This corresponds to the state that the data information is recorded. If the probe 11 is moved in an arrow-pointing direction, a detection voltage corresponds to the polarization P and is outputted as a square wave which swings up and down. Incidentally, this level changes depending on the polarization extent of the polarization P, and the data information can be recorded as an analog signal.

Figure 4:
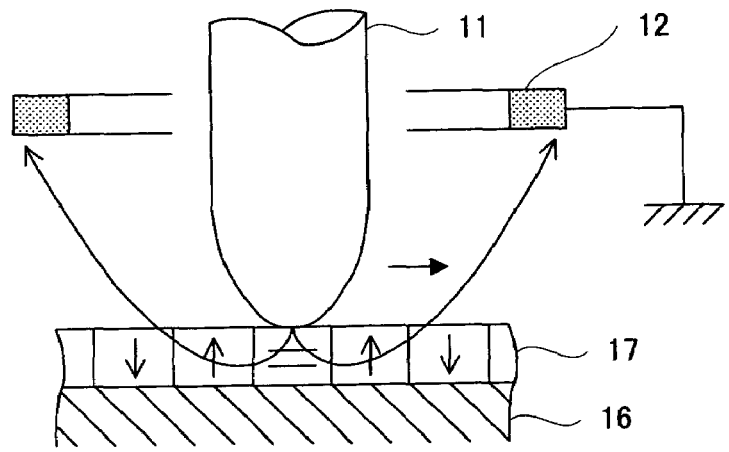
FIG. 4 is a cross sectional view conceptually showing the reproduction operation of the ferroelectric reproducing apparatus in the embodiment.

Next, with reference to FIG. 4 to FIG. 7, the reproduction operation of the dielectric recording/reproducing apparatus 1 in the embodiment will be explained. FIG. 4 is a cross sectional view conceptually showing the reproduction operation of the data information.

The nonlinear dielectric constant of a ferroelectric substance changes in accordance with the polarization direction of the ferroelectric substance. The nonlinear dielectric constant of the ferroelectric substance can be detected as a difference in the capacitance of the ferroelectric substance or a difference in the capacitance change, when an electric field is applied to the ferroelectric substance. Therefore, by applying an electric field to the ferroelectric material and by detecting a difference in the capacitance Cs or a difference in the change of the capacitance Cs in a certain micro domain of the ferroelectric material at that time, it is possible to read and reproduce the data recorded as the polarization direction of the ferroelectric material.

Specifically, at first, as shown in FIG. 4, an alternating electric field from the not-illustrated AC signal generator 14 is applied between the electrode 16 and the return electrode 12. The alternating electric field has an electric field strength which does not exceed the coercive electric field of the ferroelectric material 17, and has a frequency of approximately 5 kHz, for example. The alternating electric field is generated mainly to distinguish the difference in the capacitance change corresponding to the polarization direction of the ferroelectric material 17. Incidentally, in place of the alternating electric field, a direct current bias voltage may be applied to form an electric field in the ferroelectric material 17. The application of the alternating electric field causes the generation of an electric field in the ferroelectric material 17 of the ferroelectric recording medium 20.

Then, the probe 11 is put closer to a recording surface until the distance between the tip of the probe 11 and the recording surface becomes extremely small on the order of nanometers. Under this condition, the oscillator 13 is driven. Incidentally, in order to detect the capacitance Cs of the ferroelectric material 17 under the probe 11 highly accurately, it is preferable to contact the probe 11 with the surface of the ferroelectric material 17, i.e. the recording surface. However, in order to read the data recorded in the ferroelectric material 17 at high speed, it is necessary to relatively displace the probe 11 on the ferroelectric recording medium 20 at high speed. Thus, in view of reliability in the high-speed displacement, and the prevention of damage caused by the collision and friction between the probe 11 and the ferroelectric recording medium 20, or the like, it is practically better to put the probe 11 close to the recording surface, to the extent that this can be regarded as the actual contact, than put the probe 11 in contact with the recording surface. For this purpose, an extremely thin lubricant may be coated on the recording surface.

Then, the oscillator 13 oscillates at the resonance frequency of the resonance circuit, which includes the inductor L and the capacitance Cs associated with the ferroelectric material 17 under the probe 11, as the constituent factors. The center frequency of the resonance frequency is set to approximately 1 GHz, as described above.

Here, the return electrode 12 and the probe 11 constitute one portion of the resonance circuit including the oscillator 13. The high-frequency signal of approximately 1 GHz, which is applied to the ferroelectric material 17 from the probe 11, passes through the ferroelectric material 17 and returns to the return electrode 12, as shown with lines in FIG. 4. By disposing the return electrode 12 in the vicinity of the probe 11 and shortening a feedback route to the resonance circuit including the oscillator 13, it is possible to reduce noise (e.g. a floating capacitance component) entering the resonance circuit.

In addition, the change of the capacitance Cs corresponding to the nonlinear dielectric constant of the ferroelectric material 17 is extremely small. In order to detect this change, it is necessary to adopt a detection method having high detection accuracy. In a detection method using FM modulation, generally, the high detection accuracy can be obtained, but it is necessary to further improve the detection accuracy, in order to make it possible to detect the small capacitance change corresponding to the nonlinear dielectric constant of the ferroelectric material 17. Thus, in the ferroelectric recording/reproducing apparatus 1 in the embodiment (i.e. recording/reproducing apparatus which uses the SNDM principle), the return electrode 12 is located in the vicinity of the probe 11 to shorten the feedback route to the resonance circuit as much as possible. By this, it is possible to obtain extremely high detection accuracy, and thus it is possible to detect the small capacitance change corresponding to the nonlinear dielectric constant of the ferroelectric substance.

After the oscillator 13 and the AC signal generator 14 are driven, the probe 11 is displaced in parallel with the recording surface on the ferroelectric recording medium 20 in which the information is recorded. By the displacement, the domain (the record information) of the ferroelectric material 17 under the probe 11 is changed, and whenever the polarization direction thereof changes, the pattern of an increase or decrease in the capacitance Cs by the AC signal generator 14 is reversed. If the capacitance Cs changes, the resonance frequency, i.e. the oscillation frequency of the oscillator 13, changes. As a result, the oscillator 13 outputs a signal which is FM-modulated on the basis of the change of the capacitance Cs. At this time, the high-frequency electric field of the oscillator 13 is modulated at the frequency of the AC signal generator 14 such that there is a difference of exactly 180 degrees in phase, in response to the reverse of an increase and decrease pattern of the capacitance Cs corresponding to the plus-minus sign of the domain of the ferroelectric material 17.

This FM signal is frequency-voltage converted by the demodulator 30. As a result, the change of the capacitance Cs is converted to the extent of a voltage. The change of the capacitance Cs corresponds to the nonlinear dielectric constant of the ferroelectric material 17. The nonlinear dielectric constant corresponds to the polarization direction of the ferroelectric material 17. The polarization direction corresponds to the data recorded in the ferroelectric material 17. Therefore, a signal obtained from the demodulator 30 is a signal in which a voltage changes correspondingly to the data recorded in the ferroelectric recording medium 20. Moreover, the signal obtained from the demodulator 30 is supplied to the signal detector 34, and the data recorded in the ferroelectric recording medium 20 is extracted by the coherent detection or synchronized detection, for example.

At this time, in the signal detector 34, an AC signal generated by the AC signal generator 14 is used as a reference signal. This makes it possible to extract the data highly accurately by synchronizing with the reference signal, as described later, even if the signal obtained from the demodulator 30 includes much noise or even if the data to be extracted is weak, for example.

Particularly in the embodiment, on the demodulator 30, after the frequency of the FM signal outputted from the oscillator 13 is converted to a lower frequency, the sideband wave on the high-frequency side of the signal is cut off and the squared-detection is performed with respect to the FM signal in which the sideband wave on the high-frequency side is cut off, to thereby reproduce and output a record signal (i.e. the data information).

Figure 5:
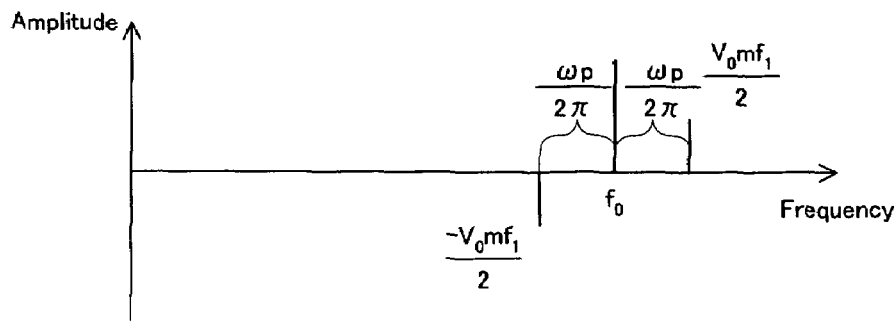
FIG. 5 is a spectral view which indicates an oscillation signal modulated upon the reproduction of the ferroelectric reproducing apparatus in the embodiment.
Figure 6:
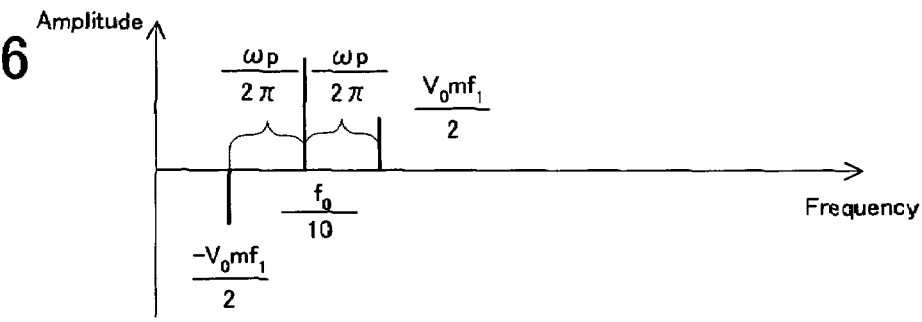
FIG. 6 is a spectral view which indicates a signal after cutting the sideband wave of the oscillation signal shown in FIG. 5.

Hereinafter, the demodulation operation of the modulated oscillation signal (i.e. FM signal) will be discussed with reference to FIG. 5 to FIGS. 7. FIG. 5 is a spectral view which indicates a FM-modulated oscillation signal outputted from the oscillator 13. FIG. 6 is a spectral view which indicates the FM signal after it is frequency-converted. FIGS. 7 are spectral views which indicate the FM signal after passing through the LPF 32. Incidentally, in the spectral views associated with FIG. 5 to FIGS. 7, a carrier wave as being the oscillation frequency and the first-order (or primary) sideband waves thereof are extracted to explain, and the second-order sideband waves are omitted.

As shown in FIG. 5, the oscillation signal includes: a carrier wave expressed by a resonance frequency $f_0$; and sideband waves including a signal based on the capacitance change $\Delta C$.

Here, the resonance frequency $f_0$ is expressed by an Equation 1.

$$f_0 = \frac{1}{2\pi\sqrt{LCs}} \quad \text{[Equation 1]}$$

Then, when a high-frequency electric field is applied to the ferroelectric recording medium 20 through the probe 11 from the oscillator 13 with the resonance frequency $f_0$ and at the same time, an alternating electric field with an oscillation angular frequency of $\omega_p$ is applied to the ferroelectric recording medium 20, a frequency change $\Delta f$ of $f_0$ due to a nonlinear effect is expressed by an Equation 2, wherein the amplitude of the alternating electric field is A, and a nonlinear constant of the lowest order is $k_1$.

$$\frac{\Delta f}{f_0} = \frac{\Delta\omega}{\omega_0} = k_1 A\cos(\omega_p t) \quad \text{[Equation 2]}$$

Therefore, an angular frequency $\omega(t)$ of the high-frequency electric field at a time point of t is expressed by an Equation 3.

$$\omega(t)=\omega_0+\Delta\omega=\omega_0+\omega_0 k_1 A\cos(\omega_p t) \quad \text{[Equation 3]}$$

Moreover, if the angular frequency is integrated by time t, a phase angle $\theta(t)$ is obtained. Then, if the both sides of the Equation 3 are integrated by the time t, the phase angle $\theta(t)$ is expressed by an Equation 4.

$$\theta(t) = \int \omega(t)dt \quad \text{[Equation 4]}$$

$$= \int \{\omega_0 + \omega_0 k_1 A\cos(\omega_p t)\}dt$$

$$= \omega_0 t + \frac{\omega_0 k_1 A}{\omega_p}\sin(\omega_p t)$$

Here, it is defined as an Equation 5, and the Equation 5 is substituted into the Equation 4. The phase angle $\theta(t)$ is expressed by an Equation 6.

[Equation 5]

$$\frac{\omega_0 k_1 A}{\omega_p} = mf_1 \quad (5)$$

[Equation 6]

$$\theta(t) = \omega_0 t + mf_1 \sin(\omega_p t) \quad (6)$$

Here, $mf_1$ in the Equation 5 is a modulation index, and $mf_1$ includes the reproduction signal (i.e. polarization information) to be detected on the ferroelectric recording/reproducing apparatus 1.

At this time, an output V(t) of the oscillator 13 which is FM-modulated by the alternating electric field having the oscillation angular frequency of $\omega_p$ is expressed by an Equation 7. Namely, the output V(t) changes the phase thereof by the angular frequency of $\omega_p$ of the alternating electric field, on the basis of the resonance angular frequency of $\omega_0$ of the oscillator 13.

$$V(t) = V_0 \cos\{\omega_0 t + mf_1 \sin(\omega_p t)\} \quad \text{[Equation 7]}$$

$$= V_0 \cos(\omega_0 t)\cos\{mf_1 \sin(\omega_p t)\} -$$

$$V_0 \sin(\omega_0 t)\sin\{mf_1 \sin(\omega_p t)\}$$

Here, each term in the most right side is expanded, as shown in respective one of an Equation 8 and an Equation 9, by using a Bessel function.

$$\cos\{(mf_1 \sin(\omega_p t)\} = J_0(mf_1) + 2\sum_{n=1}^{\infty} J_{2n}(mf_1)\cos(2n\omega_p t) \quad \text{[Equation 8]}$$

$$\sin\{mf_1 \sin(\omega_p t)\} = 2\sum_{n=0}^{\infty} J_{2n+1}(mf_1)\sin\{(2n+1)\omega_p t\} \quad \text{[Equation 9]}$$

Therefore, by substituting the Equation 8 and the Equation 9 into the Equation 7, the output V(t) of the oscillator 13 is expressed by an Equation 10. In the Equation 10, it is assumed that only the carrier wave and the first-order sideband waves out of the FM signal are considered. In other words, it is treated such that the second-order sideband waves are negligible with respect to the first-order sideband waves because of the small amplitudes.

$$V(t) \approx V_0 J_0(mf_1)\cos(\omega_0 t) + V_0 J_1(mf_1)\lfloor \cos\{(\omega_0+\omega_p)t\} - \cos\{(\omega_0-\omega_p)t\}\rfloor \quad \text{Equation 10}$$

Moreover, if $mf_1 \ll 1$, relationships shown in an Equation 11 and an Equation 12 are established. Therefore, the output V(t) of the oscillator 13 shown in the Equation 7 is expressed by an Equation 13. Incidentally, the state of $mf_1 \ll 1$ is a state that the amplitude of the carrier wave is large and that the number of sideband waves are few. In other words, as long as the first-order sideband waves are considered, it is a state that the modulated signal can be appropriately reproduced. It is the same state as the condition when the above-mentioned Equation 10 is derived.

$$\cos\{mf_1 \sin(\omega_p t)\} \approx 1 \quad \text{[Equation 11]}$$

$$\sin\{mf_1 \sin(\omega_p t)\} \approx mf_1 \sin(\omega_p t) \quad \text{[Equation 12]}$$

[Equation 13]

$$V(t) \approx V_0 \cos(\omega_0 t) + \frac{V_0 mf_1}{2}\left[\begin{array}{c}\cos\{(\omega_0+\omega_p)t\} - \\ \cos\{(\omega_0-\omega_p)t\}\end{array}\right] \quad (11)$$

Out of each term expressed by the Equation 13, the first term indicates the carrier wave of the FM signal, and the second and third terms indicate the first-order sideband waves which appear above and below the carrier wave in the spectral view.

In other words, as shown in FIG. 5, the carrier wave appears with an amplitude of Vo at the position of the frequency $f_0$. Then, away from the carrier wave by a frequency of $+\omega_p/2\pi$ or $-\omega_p/2\pi$, the two first-order sideband waves appear with amplitudes of $+V_0 mf_1/2$ or $-V_0 mf_1/2$. Then, the FM signal is outputted to the demodulator 30 from the oscillator 13.

In the demodulator 30 to which the signal shown in FIG. 5 is inputted, conversion (i.e. mixing down) is performed by the frequency converter 31, to make the frequency of the FM signal lower. Here, for example, the conversion is performed to make one-tenth of the frequency. In other words, as shown in FIG. 6, the FM signal which appears in a lower frequency side ($f_0/10$ in FIG. 6) is outputted. For example, if the frequency of the carrier wave is 1 GHz, the frequency of the FM signal outputted from the frequency converter 31 is 100 MHz.

Therefore, even if a high frequency is assigned to the carrier wave, the signal can be demodulated after converted to a lower frequency by the operation of the frequency converter 31. Moreover, the carrier wave is FM-modulated, so that it has such a characteristic that the interval of the carrier wave and the sideband waves (i.e. bandwidth) is not changed even if mixing down is performed by the frequency converter 31. For example, if the modulation is performed by using a band of 10 MHz with respect to carrier wave of 1 GHz, the modulation band occupies 1% with respect to the carrier wave. On the other hand, if the frequency of the carrier wave is converted to 100 MHz by mixing down, since the interval of the modulation band is 10 MHz as it is, the modulation band occupies 10% with respect to the carrier wave.

As described above, the modulation bandwidth is not changed, so that even if the FM signal is mixed down, it is possible to appropriately reproduce the modulated data information from the first-order sideband waves. Therefore, it is possible to increase the relative interval of the carrier wave and the sideband waves by the mixing down, and it is also possible to cut the sideband wave on the high-frequency side by the LPF 32, as described later. By this, it is possible to use the carrier wave with a high frequency, and there is a great advantage that the reproduction speed of the signal, i.e. the reproduction speed of the ferroelectric reproducing apparatus 1, can be improved more.

Incidentally, the mixing down by the frequency converter 31 is not necessarily performed. For example, if the frequency of the carrier wave is already low, the FM signal may be directly outputted to the LPF 32 without through the frequency converter 31. Moreover, there may be provided a frequency monitoring device for monitoring the oscillation frequency outputted from the oscillator 13. By virtue of the frequency monitoring device, if the oscillation frequency of a predetermined frequency or more is outputted, the FM signal may pass through the frequency converter 31, and in other case, the FM signal may be outputted from the oscillator 13 to the LPF 32.

In addition, the fact that the modulation bandwidth is not changed has the following advantage. For example, it is possible to eliminate an influence of the frequency change or the like, caused by small vibration which occurs in the probe 11, and to reproduce the data information. In other words, if the sideband component caused by the vibration of the probe 11 is eliminated and only the sideband waves based on the frequency of the AC signal generator 14 are detected, it is possible to reproduce the data information.

Then, in the LPF 32, the first-order sideband wave which appears on the high-frequency side out of the two first-order sideband waves is cut, and the FM signal with the first-order sideband wave on the high-frequency side cut is outputted to the squared-detector 33. In other words, as shown in FIG. 7(*a*), the carrier wave and the first-order sideband wave on the low-frequency side constitute the FM signal after passing through the LPF 32, and the FM signal is outputted to the squared-detector 33.

The output of the oscillator 13 after the first-order sideband wave on the high-frequency side is cut from the FM signal expressed by the Equation 13 is expressed by an Equation 14.

$$V(t) = V_0 \cos(\omega_0 t) - \frac{V_0 mf_1}{2} \cos\{(\omega_0 - \omega_p)t\} \quad \text{[Equation 14]}$$

Then, after the first-order sideband wave on the high-frequency side is cut, the FM signal is squared-detected by the operation of the squared-detector 33. The output $V(t)^2$ after the squared-detection of the FM signal shown in the Equation 14 is expressed by an Equation 15.

$$V(t)^2 = V_0^2 \cos^2(\omega_0 t) + \left(\frac{V_0 mf_1}{2}\right)^2 \cos^2\{(\omega_0 - \omega_p)t\} - \quad \text{[Equation 15]}$$
$$V_0^2 mf_1 \cos(\omega_0 t)\cos\{(\omega_0 - \omega_p)t\}$$
$$= \frac{V_0^2}{2}\{\cos(2\omega_0 t) + 1\} +$$
$$\frac{1}{2}\left(\frac{V_0 mf_1}{2}\right)^2 [\cos 2\{(\omega_0 - \omega_p)t\} + 1] -$$
$$\frac{1}{2} V_0^2 mf_1 [\cos\{(2\omega_0 - \omega_p)t\} + \cos(\omega_p t)]$$

Therefore, by the Equation 15, it is possible to detect $mf_1$ as being the polarization information, by the coherent detection or synchronized detection of the FM signal after squared-detection with the signal of $\omega_p$ (i.e. the reference signal from the AC signal generator 14).

Incidentally, as a comparison example of the embodiment, the case where the FM signal including the two first-order sideband waves is squared-detected as it is, without using the LPF 32, will be discussed below.

If the FM signal expressed by the Equation 13 is squared-detected as it is, the output $V(t)^2$ is expressed by an Equation 16.

$$V(t)^2 = V_0^2 \cos^2(\omega_0 t) + \quad \text{[Equation 16]}$$
$$\left(\frac{V_0 mf_1}{2}\right)^2 \begin{bmatrix} \cos\{(\omega_0 + \omega_p)t\} - \\ \cos\{(\omega_0 - \omega_p)t\} \end{bmatrix}^2 +$$
$$V_0^2 mf_1 \begin{bmatrix} \cos(\omega_0 t)\cos\{(\omega_0 + \omega_p)t\} - \\ \cos(\omega_0 t)\cos\{(\omega_0 - \omega_p)t\} \end{bmatrix}$$
$$= \frac{V_0^2}{2}\{\cos(2\omega_0 t) + 1\} +$$
$$\frac{1}{2}\left(\frac{V_0 mf_1}{2}\right)^2 \begin{bmatrix} \cos 2\{(\omega_0 + \omega_p)t\} + \\ \cos 2\{(\omega_0 - \omega_p)t\} + \\ 2 - 2\cos(2\omega_0 t) - 2\cos(2\omega_p t) \end{bmatrix} +$$
$$\frac{1}{2} V_0^2 mf_1 \begin{bmatrix} \cos\{(2\omega_0 + \omega_p)t\} + \cos(\omega_p t) - \\ \cos\{(2\omega_0 - \omega_p)t\} - \cos(\omega_p t) \end{bmatrix}$$

Here, in order to detect $mf_1$ as being the polarization information from the FM signal after squared-detection, the coherent detection or synchronized detection may be performed with the signal of $\omega_p$; however, in the third term of the second equation of the Equation 16, the term of $\cos(\omega_p t)$ in the square bracket is eliminated. In other words, under the condition of the Equation expressed by the Equation 16, it is impossible to detect $mf_1$ from the FM signal after squared-detection.

However, as in the ferroelectric reproduction apparatus 1 in the embodiment, by cutting the first-order sideband wave on the high-frequency side out of the two first-order sideband waves, it is possible to detect $mf_1$ as expressed by the Equation 15.

Incidentally, the conventional FM modulator (which is available substantially easily) has such a technical problem that it only performs demodulation with a bandwidth of about 200 kHz. However, according to the ferroelectric reproduction apparatus in the embodiment, by performing the squared-detection to demodulate the FM signal, it is possible to reproduce the FM signal in which modulation is performed at several tens MHz with respect to the carrier wave which exceeds 1 GHz, for example, without consideration of the band limit. In other words, even if broadband modulation is performed to the high-frequency carrier wave, the signal can be demodulated and the output signal (i.e. the record data) can be reproduced. As described above, since it is possible to reproduce the FM signal in which the broadband modulation is performed at several tens MHz, it is also possible to improve the reproduction speed of the ferroelectric reproducing apparatus to about 1 Gbps, for example.

Moreover, the mixing down of the carrier wave can facilitate the subsequent demodulation operation, and allows the demodulation of the carrier wave with a higher frequency, e.g. about several GHz. Moreover, even if the frequency of the carrier wave is changed due to a floating capacitance or the like, there is no change in the positions of the sideband waves based on the carrier wave, as described above. Thus, it is possible to perform the reproduction which is stable and resistant to exterior noise or the like.

Incidentally, instead of the LPF 32, a HPF (High Pass Filter) may be used as well. In other words, even if the first-order sideband wave on the low-frequency side is cut out of the two first-order sideband waves, it is possible to detect $mf_1$ as being the polarization information. The operation will be discussed below by using equations.

The output of the oscillator 13 after the first-order sideband wave on the high-frequency side is cut from the FM signal expressed by the Equation 13 is expressed by an Equation 17.

$$V(t) = V_0\cos(\omega_0 t) + \frac{V_0 mf_1}{2}\cos\{(\omega_0 + \omega_p)t\} \quad \text{[Equation 17]}$$

Moreover, the FM signal after the first-order sideband wave on the low-frequency side is cut by the HPF is shown in FIG. 7(b). If this is squared-detected on the squared-detector 33, the output $V(t)^2$ is expressed by an Equation 18.

$$\begin{aligned}V(t)^2 &= V_0^2\cos^2(\omega_0 t) + \left(\frac{V_0 mf_1}{2}\right)^2\cos^2\{(\omega_0+\omega_p)t\} + \\ &\quad V_0^2 mf_1\cos(\omega_0 t)\cos\{(\omega_0+\omega_p)t\} \\ &= \frac{V_0^2}{2}\{\cos(2\omega_0 t)+1\} + \\ &\quad \frac{1}{2}\left(\frac{V_0 mf_1}{2}\right)^2[\cos2\{(\omega_0+\omega_p)t\}+1] + \\ &\quad \frac{1}{2}V_0^2 mf_1[\cos\{(2\omega_0+\omega_p)t\}+\cos(\omega_p t)]\end{aligned} \quad \text{[Equation 18]}$$

Therefore, as expressed in the Equation 18, it is possible to detect $mf_1$ as being the polarization information, by the coherent detection or synchronized detection of the FM signal with the signal of $\omega_p$.

Incidentally, it is easier to produce the LPF 32 than the HPF, and it is easier to perform the signal process to the low-frequency component than to the high-frequency component. Thus, it is preferable to use the LPF. However, even if the HPF is used, it is possible to detect the polarization information, as expressed by the above-mentioned Equation 18.

Moreover, in the above-mentioned embodiment, the ferroelectric material 17 is used for the recording layer; however, the ferroelectric material 17 may be another dielectric substance which can leave the record information as remnant spontaneous polarization, or another material which can leave the record information as a difference in the dielectric constant.

In the present invention, various changes may be made, if desired, without departing from the essence or spirit of the invention which can be read from the claims and the entire specification. The signal detecting method and apparatus, all of which involves such changes, are also intended to be within the technical scope of the present invention.

INDUSTRIAL APPLICABILITY

The present invention can be applied to the signal detecting method and apparatus in reproducing the polarization direction recorded in the dielectric substance, such as the ferroelectric recording medium, and the information reproducing apparatus and method which use the signal detecting method.

The invention claimed is:

1. A signal detecting method of detecting an output signal which indicates data information included at least two sideband waves from an input signal having a carrier wave and the at least two sideband waves which accompany the carrier wave,
said signal detecting method comprising:
a cutting process of cutting the sideband wave located on one of a high-frequency side and a low-frequency side as compared to the carrier wave, from the at least two sideband waves; and
a squared-detecting process of outputting the output signal by squared-detecting the input signal in which the one of the sideband waves is cut.

2. The signal detecting method according to claim 1, wherein
said signal detecting method further comprises a frequency converting process of converting a frequency of the input signal, and
the one of the sideband waves is cut from the input signal whose frequency is converted in said cutting process.

3. The signal detecting method according to claim 2, wherein the frequency is converted to make it relatively low in said frequency converting process.

4. The signal detecting method according to claim 2, wherein
said signal detecting method further comprises a judging process of judging whether or not the frequency is higher than a predetermined value, and
if it is judged in said judging process that the frequency is higher than the predetermined value, the frequency is converted in said frequency converting process.

5. The signal detecting method according to claim 1, wherein the carrier wave and a first-order sideband wave are squared-detected, out of the input signal in which the one of the sideband waves is cut, in said squared-detecting process.

6. The signal detecting method according to claim 5, wherein if an amplitude of the carrier wave is $V_0$, a modulation index is $mf_1$, an angular frequency of the carrier wave is $\omega_0$, and a difference in the angular frequency between the carrier wave and the first order sideband wave is $\omega_p$, the first sideband wave is squared-detected, with it expressed by $(V_0 mf_1/2)\times\cos((\omega_0+\omega_p)t)$ or $-(V_0 mf_1/2)\times\cos((\omega_0-\omega_p)t)$ at a time point of t.

7. The signal detecting method according to claim 1, wherein the sideband wave on the high-frequency side is cut out of the at least two sideband waves in said cutting process.

8. The signal detecting method according to claim 1, wherein
the data information is recorded in a recording medium, and
said signal detecting method further comprises a signal obtaining process of obtaining the input signal by applying a high-frequency electric field to the recording medium and by applying an alternating electric field with a lower frequency than that of the high-frequency electric field.

9. The signal detecting method according to claim 8, wherein the recording medium comprises a recording layer including a dielectric substance.

10. A signal detecting apparatus for detecting an output signal which indicates data information included at least two sideband waves from an input signal having a carrier wave and the at least two sideband waves which accompany the carrier wave,
said signal detecting apparatus comprising:
a cutting device for cutting the sideband wave located on one of a high-frequency side and a low-frequency side as compared to the carrier wave, from the at least two sideband waves; and
a squared-detecting device for outputting the output signal by squared-detecting the input signal in which the one of the sideband waves is cut.

11. An information reproducing apparatus for reproducing data information recorded in a recording medium,
said information reproducing apparatus comprising:
a reading device for reading a reproduction signal having a carrier wave and at least two sideband waves which accompany the carrier wave and which include the data information, from the recording medium;

a cutting device for cutting the sideband wave located on one of a high-frequency side and a low-frequency side as compared to the carrier wave, from the at least two sideband waves;

a squared-detecting device for squared-detecting the reproduction signal in which the one of the sideband waves is cut; and a reproducing device for extracting and reproducing the data information from the squared-detected reproduction signal.

12. The information reproducing apparatus according to claim 11, wherein said reading device reads the reproduction signal by applying a high-frequency electric field to a recording layer of the recording medium and by applying an alternating electric field with a lower frequency than that of the high-frequency electric field.

13. The information reproducing apparatus according to claim 11, wherein said information reproducing apparatus further comprises a frequency converting device for converting a frequency of the reproduction signal, and said cutting device cuts the one of the sideband waves from the reproduction signal whose frequency is converted.

14. The information reproducing apparatus according to claim 11, wherein the recording medium comprises a recording layer including a dielectric substance.

15. The information reproducing apparatus according to claim 11, wherein said information reproducing apparatus reproduces the data information on the basis of nonlinear dielectric microscopy.

16. An information reproducing method of reproducing data information recorded in a recording medium, said information reproducing method comprising:

a reading process of reading a reproduction signal having a carrier wave and at least two sideband waves which accompany the carrier wave and which include the data information, from the recording medium;

a cutting process of cutting the sideband wave located on one of a high-frequency side and a low-frequency side as compared to the carrier wave, from the at least two sideband waves;

a squared-detecting process of squared-detecting the reproduction signal in which the one of the sideband waves is cut; and a reproducing process of extracting and reproducing the data information from the squared-detected reproduction signal.

* * * * *